United States Patent
Wiebe et al.

(10) Patent No.: US 9,141,985 B1
(45) Date of Patent: Sep. 22, 2015

(54) SIMPLIFIED SELLER LISTING SERVICE

(75) Inventors: Joanna K. Wiebe, Vashon, WA (US);
Steven A. Miles, Seattle, WA (US);
Evan N. Rothmayer, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 760 days.

(21) Appl. No.: 13/409,314

(22) Filed: Mar. 1, 2012

(51) Int. Cl.
*G06Q 30/00* (2012.01)
*G06Q 30/06* (2012.01)

(52) U.S. Cl.
CPC ........ *G06Q 30/0613* (2013.01); *G06Q 30/0603* (2013.01); *G06Q 30/0619* (2013.01); *G06Q 30/0641* (2013.01); *G06Q 30/0643* (2013.01)

(58) Field of Classification Search
CPC .......... G06Q 30/0603; G06Q 30/0613; G06Q 30/0619; G06Q 30/0641; G06Q 30/0643
USPC ........................... 705/26.41, 26.44, 27.1, 27.2
See application file for complete search history.

(56) References Cited

U.S. PATENT DOCUMENTS

| | | | |
|---|---|---|---|
| 6,789,252 B1 * | 9/2004 | Burke et al. | 717/100 |
| 7,860,757 B2 * | 12/2010 | Cotton et al. | 705/26.42 |
| 7,881,969 B2 * | 2/2011 | Wiseman et al. | 705/26.2 |
| 8,051,079 B2 * | 11/2011 | Cheng et al. | 707/733 |
| 8,145,545 B2 * | 3/2012 | Rathod et al. | 705/27.1 |
| 2003/0200156 A1 * | 10/2003 | Roseman et al. | 705/27 |
| 2005/0171858 A1 * | 8/2005 | Cotton et al. | 705/26 |
| 2007/0136178 A1 * | 6/2007 | Wiseman et al. | 705/37 |
| 2008/0147552 A1 * | 6/2008 | Morsillo et al. | 705/44 |
| 2008/0154898 A1 * | 6/2008 | Cheng et al. | 707/6 |
| 2008/0262865 A1 * | 10/2008 | Cotton et al. | 705/1 |
| 2009/0313138 A1 * | 12/2009 | Ratnakar | 705/27 |
| 2010/0100457 A1 * | 4/2010 | Rathod et al. | 705/27 |
| 2011/0251916 A1 * | 10/2011 | Sipper | 705/26.3 |
| 2012/0109773 A1 * | 5/2012 | Sipper et al. | 705/26.3 |
| 2013/0084000 A1 * | 4/2013 | Bhardwaj et al. | 382/165 |

OTHER PUBLICATIONS

Budimir, M., et al., "Engineering Goes Online Big Time," Machine Design, vol. 73, No. 1, p. 92, Jan. 11, 2001.*

* cited by examiner

*Primary Examiner* — Nicholas D Rosen
(74) *Attorney, Agent, or Firm* — Thomas | Horstemeyer, LLP

(57) ABSTRACT

Disclosed are various embodiments of a method and system for providing a simplified listing process for sellers. A computing device obtains contact information for a seller and a representation of an item that may be purchased through an electronic marketplace. This information is obtained without requiring the seller to register with the electronic marketplace. Using the representation of the item, a seller listing for the item in the electronic marketplace is generated. The seller is notified through the contact information when a buyer purchases the item from the seller through the generated seller listing.

20 Claims, 11 Drawing Sheets

SIMPLIFIED SELLER LISTING SERVICE

An electronic commerce system operated by an online merchant allows users to purchase products online. The products are organized in a catalog. The user can search for products by attributes and can also view attributes of a particular product. Various sellers may offer items for sale in the form of a catalog or product listing. Each seller listing provides information about the seller's offer, including a price.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to seller listings for an electronic marketplace. According to one embodiment disclosed herein, a seller uploads to a simplified listing generator application an image of a product, an image of a product identifier, or other representation of a product. The seller also provides minimal offer attributes, such as price and quantity, as well as contact information to the simplified listing generator application. The simplified listing generator application then uses the seller-provided information to create a seller listing which is published in an electronic marketplace.

Notably, the seller is not required to provide information specifying the manner in which funds will be disbursed to the seller during this simplified listing process. Instead, the act of gathering disbursement information is deferred until a buyer purchases the product through the simplified listing. Upon such a purchase, the simplified listing generator application uses the seller contact information provided during the simplified listing process to notify the seller of the purchase. The seller responds with disbursement information and the electronic commerce application arranges for the funds to be disbursed to the seller.

In some embodiments the simplified listing generator application makes available to the seller additional information to facilitate the listing process. For example, the seller may be presented with sales activity for the product of interest, such as a list of other retailers that sell the product along with the price offered. As another example, the seller may be presented with information about possible sources through which the seller can obtain the product of interest, such as wholesalers or distributors. In the following discussion, a general description of the system and its components is provided, followed by a discussion of the operation of the same.

Figure 1:
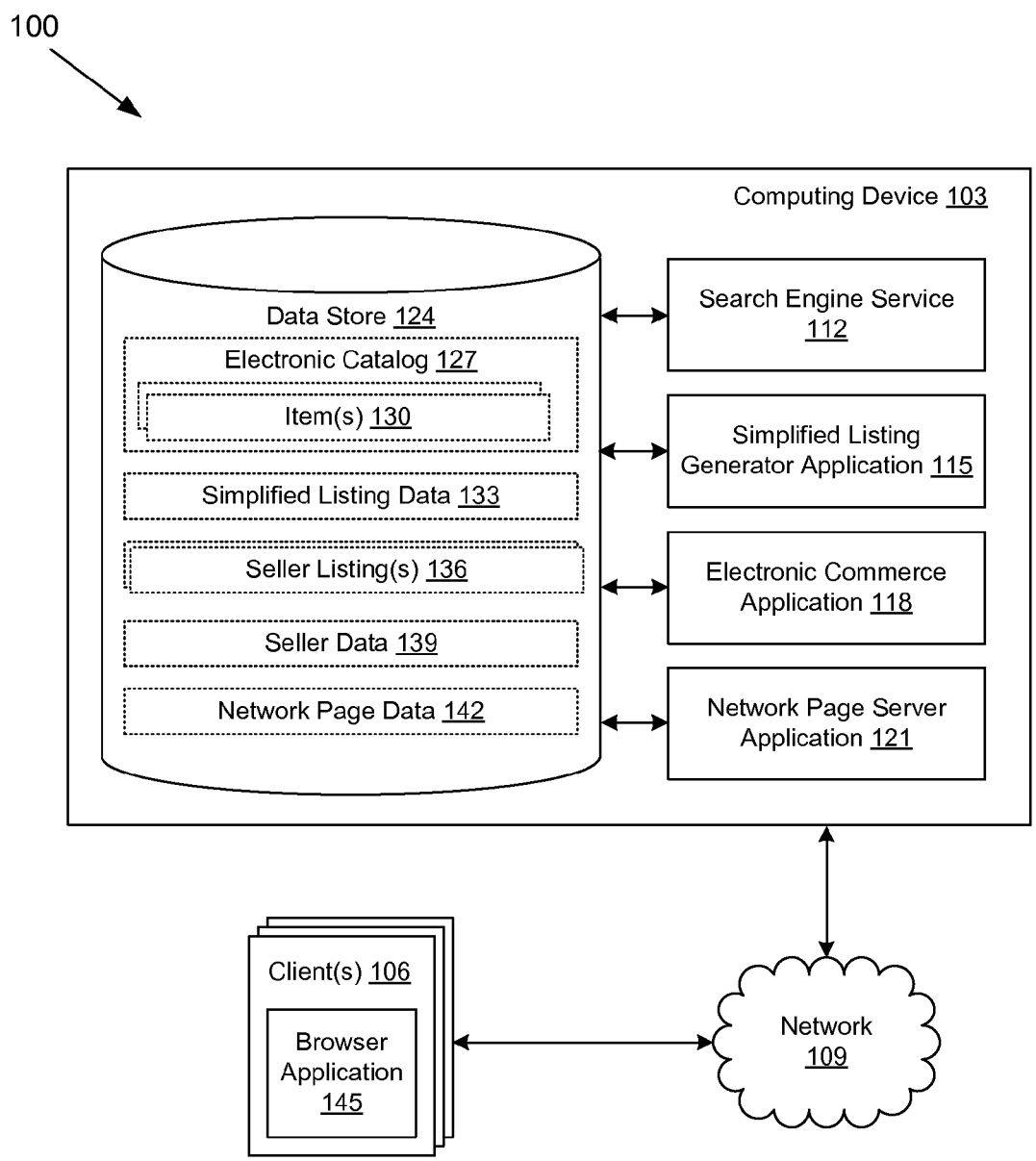
FIG. 1 is a drawing of a networked environment according to one embodiment of the present disclosure.

With reference to FIG. 1, shown is a networked environment 100 according to various embodiments. The networked environment 100 includes a computing device 103 that is in data communication with one or more client devices 106 by way of a network 109. The network 109 may include, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. To this end, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. The components executed on the computing device 103, for example, include a search engine service 112, a simplified listing generator application 115, an electronic commerce application 118, a network page server application 121, and other applications, services, processes, systems, engines, or functionality not discussed in detail herein. Also, various data is stored in a data store 124 that is accessible to the computing device 103. The data stored in the data store 124 may include, for example, an electronic catalog 127 of items 130, simplified listing data 133, seller listings 136, seller data 139, network page data 142, and/or potentially other data. The data store 124 may be representative of a plurality of data stores 124 as can be appreciated. The data stored in the data store 124, for example, is associated with the operation of the various applications and/or functional entities described below.

The electronic catalog 127 includes data about items 130 that are offered to customers through an electronic marketplace of one or more merchants. An electronic marketplace corresponds to a network site that offers items 130 in the electronic catalog 127 for sale, download, purchase, lease, etc., by users. An item 130 may correspond to any product, good, service, software download, multimedia download, and/or other item that may be offered for sale, purchase, download, rental, lease, download, or any other form of consumption as can be appreciated. Data related to items 130, such as title, description, keywords, metadata, price, weight, customer reviews, quantities, conditions, options and/or other data may be stored by the electronic catalog 127 as item attributes.

The search engine service 112 is executed in the computing device 103 to search for those items 130 in the electronic catalog 127 that match a search query. The search engine service 112 may be a general-purpose search engine that operates to search the Internet as a whole, may be a site-specific search engine that is limited to searching one or more network sites, or may be integrated into the electronic commerce application 118. Execution of a search query produces a set of items 130 matching the query, referred to as search results. The search engine service 112 may compute or otherwise obtain a search relevance score for each search result in order to determine which of the complete set of search results are the most relevant to the user's search query. The search engine service 112 may also be executed to provide a list of search results, which may take the form of a network page generated from network page data 142. The network page data 142 may include various data such as code, templates, text, graphics, images, audio, video, multimedia, and/or any other data used in generating network pages. Each of the items 130 in the list of search results may include a link to a corresponding network page for a particular item 130.

The electronic commerce application 118 is executed in order to facilitate the online viewing and/or purchase of items 130 from an electronic marketplace of one or more merchants. For example, the electronic commerce application 118 may provide content in response to user queries about items 130 in the electronic catalog 127. To this end, the electronic commerce application 118 may include, or may utilize the services of, a network page server application 121 which is executed to fetch network pages in response to requests from the client device 106. In some embodiments, the network page server application 121 is a web server which is executed to fetch web pages. The network pages generated by the network page server application 121 may include various items 130 from the electronic catalog 127. The network pages fetched by the network page server application 121 may be static, or may be dynamically generated from network page data 142. The network page data 142 may include various data such as code, templates, text, graphics, images, audio, video, multimedia, and/or any other data used in generating network pages.

The electronic commerce application 118 may also perform various backend functions associated with the online presence of a merchant in order to facilitate the online purchase of items 130, as should be appreciated. As one example, the electronic commerce application 118 provides an interface through which sellers may create seller listings 136 and provide these listings 136 to the electronic commerce application 118. This interface may take the form, for example, of electronic document(s) uploaded to the electronic commerce application 118, or form(s) rendered by a browser, or any other suitable interface. A seller listing 136 may include an item identifier, a price, a quantity, a condition, an image of the item, and a description of the item. The seller listings 136 may be implemented in, for example, comma separated value (CSV), a binary format, a structured data format such as extensible markup language (XML), or any suitable format that is known a priori by, or is discoverable by, the simplified listing generator application 115. Sellers are required to register with the electronic commerce application 118 and/or an electronic marketplace, either before or during the process or providing seller listings 136 to the electronic commerce application 118.

The simplified listing generator application 115 is executed to generate a simplified form of a seller listing 136. The simplified seller listing 136 is generated from a reduced set of information that is obtained from a seller during a simplified listing process. The simplified listing process, which may be implemented by the simplified listing generator application 115, occurs outside of the seller registration process. In some embodiments, a seller interacting with the simplified listing generator application 115 is required to provide only contact information, information which can be used to identify the item 130, and one or more offer attributes. In some of these embodiments, the offer attributes include only a price and a quantity, along with the condition of the item 130 where a condition is appropriate. The simplified listing generator application 115 stores the information obtained from the seller during the simplified listing process in the data store 124 as simplified listing data 133.

The simplified listing generator application 115 is further executed to identify the item 130 referenced by the seller and to then generate a seller listing 136 for the item 130. Once generated, the electronic commerce application 118 handles a seller listing 136 from the simplified listing generator application 115 as any other listing, such as ones generated by a registered seller during the complete listing process. Thus, a listing for an item 130 generated through the simplified process may be made available to a buyer through an item detail network page, alongside listings for items 130 generated during the complete listing process.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a set-top box, a music player, a video player, a media player, a web pad, a tablet computer system, a game console, or other devices with like capability. In some embodiments, the client device 106 may include, or be in communication with, a bar code reader. The client device 106 may be configured to execute various applications such as a browser application 145 which accesses and renders network pages, such as web pages, or other network content. The client device 106 may be configured to execute applications beyond the browser application 145 such as, for example, email applications, instant message applications, and/or other applications.

Next, a general description of the operation of the various components of the networked environment 100 is provided. To begin, a seller who wishes to sell an item 130 through an electronic marketplace interacts with the simplified listing generator application 115 through an application executing on the client device 106, for example, the browser application 145. When a browser application 145 is used, the user interface seen by the seller takes the form of various network pages generated by the simplified listing generator application 115, perhaps in cooperation with the network page server application 121.

The seller provides, through the interface provided by the simplified listing generator application 115, a representation of the item 130. This representation may take the form of a photographic image. This representation may also take the form of a unique identifier for the item 130. The unique identifier may take the form of a universal product code, a manufacturer product or model number, a stock keeping unit (SKU) number, an International Standard Book Number (ISBN), a serial number, etc. Other representations of the item 130 are possible as well as should be appreciated. Using the item representation, the simplified listing generator application 115 determines which item 130 that the seller wants to sell through the electronic marketplace.

Some embodiments of the simplified listing generator application 115 first determine an item identifier from the item representation, and then perform a search for the item identifier in the electronic catalog 127. The search results are presented to the seller and the seller is asked to confirm that the matching item 130 is the one the seller wants to sell. If no matching item 130 is found in the electronic catalog 127, the simplified listing generator application 115 may notify the seller of this condition and terminate the simplified listing process. If multiple matching items 130 are found, the simplified listing generator application 115 may present descriptions of these matching items 130 to the seller so that the seller can select the particular item 130 that the seller wants to sell.

The simplified listing generator application 115 also obtains from the seller a minimal set of offer attributes needed to generate a seller listing 136, which includes the seller's price for the item 130 and the quantity which the seller wishes to offer to buyers. For some types of items 130, the minimal set may also include the condition of the item 130 (e.g., ranging from "fair" to "like new"). The simplified listing generator application 115 also obtains from the seller some sort of electronic contact information which may be stored in the data store 124 as seller data 139. The seller contact information may take the form of an email address or a short messaging service (SMS) address (i.e., a telephone number). Along with the contact information, seller may provide additional information such as a user name.

From the information gathered during the above-described simplified listing process, the simplified listing generator application 115 produces a seller listing 136 that includes an identifier uniquely identifying an item 130 in the electronic catalog 127, a description of the seller's specific offer (e.g., price, quantity, and condition), and information about the seller such as a user name or email address. The seller listing 136 is then processed by the electronic commerce application 118 to add the seller listing 136 to the electronic marketplace.

At a later point in time, a buyer viewing the electronic marketplace may view the simplified seller listing 136 that was created earlier by the simplified listing generator application 115. For example, this seller listing 136 may appear on an item detail network page through which a buyer purchases items 130 in the electronic marketplace. Once a buyer uses the electronic marketplace to facilitate purchase of the item 130 through the simplified seller listing 136, the simplified listing generator application 115 notifies the seller of the purchase through the seller contact information stored in the data store 124 as seller contact data 139.

At this later time, the seller may then interact again with the simplified listing generator application 115 to provide disbursement information so that the electronic commerce application 118 can facilitate disbursement of funds to the seller. The disbursement information may be stored as seller data 139 in the data store 124. Examples of such disbursement information include a bank account number, account information for a broker such as PayPal®, and information about an account with the electronic commerce application 118 (e.g., a registered seller account). Notably, the simplified listing generator application 115 defers obtaining this disbursement information until this second stage, and does not obtain this disbursement information during the initial listing process. In this manner, the listing process is simplified and streamlined to reduce the time and effort spent by seller to get a product listed in the electronic marketplace. The simplified process can be particularly desirable to sellers that have little experience with online selling or that have little expectation that a buyer will actually purchase the offered product.

Figure 2:
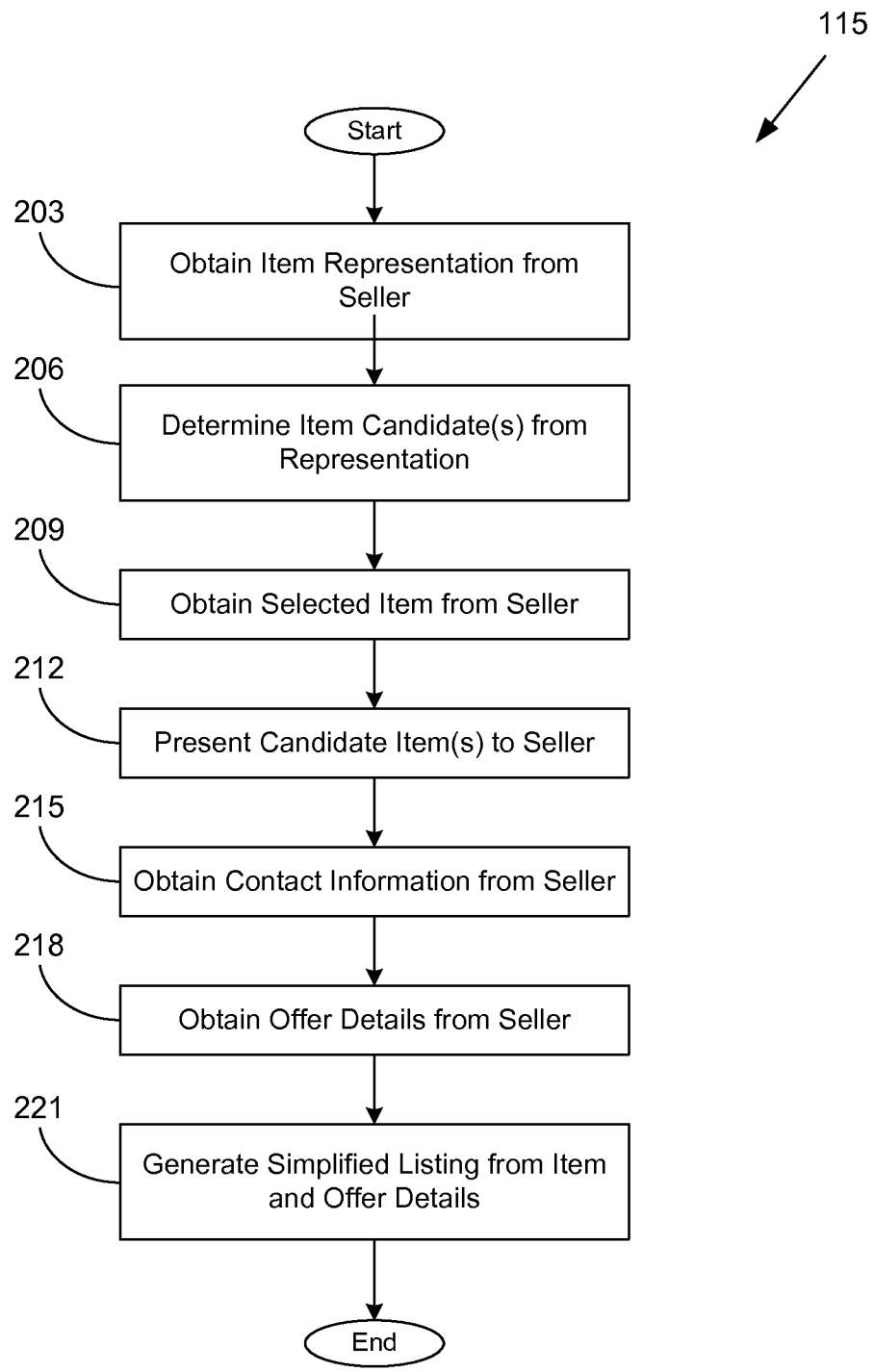
FIG. 2 is a flowchart illustrating an example of functionality implemented as portions of a simplified listing generator application 115 executed in a computing device in the networked environment of FIG. 1 according to various embodiments of the present disclosure.

Turning now to FIG. 2, shown is a flowchart that provides one example of the operation of a portion of the simplified listing generator application 115 (FIG. 1) according to various embodiments. It is understood that the flowchart of FIG. 2 provides merely an example of the many different types of functional arrangements that may be employed to implement the operation of the portion of the simplified listing generator application 115 as described herein. As an alternative, the flowchart of FIG. 2 may be viewed as depicting an example of steps of a method implemented in the computing device 103 (FIG. 1) according to one or more embodiments.

FIG. 2 illustrates the simplified process of creating a seller listing 136. Beginning at box 203, the simplified listing generator application 115 obtains from a seller a representation of an item 130 which the seller wishes to sell through the electronic marketplace. The item representation may be in the form of a photographic image, for example, an image of a bar code from the item packaging, an image of the item itself (with or without packaging). The item representation may be in the form of a unique identifier for the item 130 such as a two-dimensional or three-dimensional bar code, or a product identifier expressed as text or as an alphanumeric string. Next, at box 206, the simplified listing generator application 115 uses the item representation to determine one or more candidates for the item 130 that the seller wants to sell through the electronic marketplace.

In some embodiments, the simplified listing generator application 115 makes this determination by first determining an identifier for the item then looking in the electronic catalog 127 for items with a matching identifier. If the representation is an item identifier, the simplified listing generator application 115 simply searches for that identifier in the electronic catalog 127. If the representation is not an item identifier, the mechanism used to identify a particular item representation depends on the type of representation as should be appreciated.

As one example, if the representation is an image of a barcode, the simplified listing generator application 115 can translate the bars, stripes, and/or blocks in the barcode into a numeric or alphanumeric identifier. As another example, if the representation is a digital voice recording of the seller speaking the product identifier, the simplified listing generator application 115 can use voice recognition techniques to translate the recording into a numeric or alphanumeric identifier.

In some embodiments, the representation is not mapped to an item identifier but rather to a search query. For example, if the representation is a digital voice recording of the seller speaking a product description, the simplified listing generator application 115 can translate the recording into a search query to be executed by the search engine service 112. If the representation is an image of the item 130, the simplified listing generator application 115 can run image recognition algorithms (e.g., using SnapTell® technology) on the image and/or any text in the image in order to match the image with an item 130 in the electronic catalog 127.

At box 209, having identified one or more items 130 as possibly being the one that the seller wants to sell through the electronic marketplace, the simplified listing generator application 115 presents to the seller a list of these possible items 130. Next, at box 212, simplified listing generator application 115 receives a confirmation from the seller as to which item 130 that the seller wants to sell through the electronic marketplace. If more than one possible item 130 is identified, the simplified listing generator application 115 may request the seller to select one from the list. If only one possible item 130 is identified, the simplified listing generator application 115 may request the seller to confirm the single item 130 that is shown.

At box 215, having determined a particular item 130 which the seller wishes to sell through the electronic marketplace, the simplified listing generator application 115 obtains from the seller a limited description of the seller's specific offer which may be limited to price, quantity, and condition. Next, at box 218, the simplified listing generator application 115 obtains contact information for the seller. At box 221, the simplified listing generator application 115 uses the item identifier and the offer attributes to generate a simplified seller listing 136. The process of FIG. 2 is then complete.

Though not illustrated in FIG. 2, the seller listing 136 is then processed by the electronic commerce application 118 to add the seller listing 136 to the electronic marketplace. In some embodiments, the electronic commerce application 118 sends a confirmation of the listing 136 to the seller email, text message, or any other notification mechanism. Further operation of the simplified listing generator application 115, after the seller listing 136 has been generated will be discussed later in connection with FIG. 3.

In some embodiments, the simplified listing process described herein is implemented using a guest account. That is, the electronic commerce application 118 may already have in place a guest account mechanism by which users can provide a reduced set of information when interacting with the electronic commerce application 118. For example, the electronic commerce application 118 may support guest accounts for one-time or infrequent purchasers. Such a guest account may involve some authentication, for example a username and password, but information provided by the user in the context of a guest account is stored and then used in a limited manner by the electronic commerce application 118. The simplified listing generator application 115 may then leverage the guest account mechanism to implement the simplified listing process.

Figure 3:
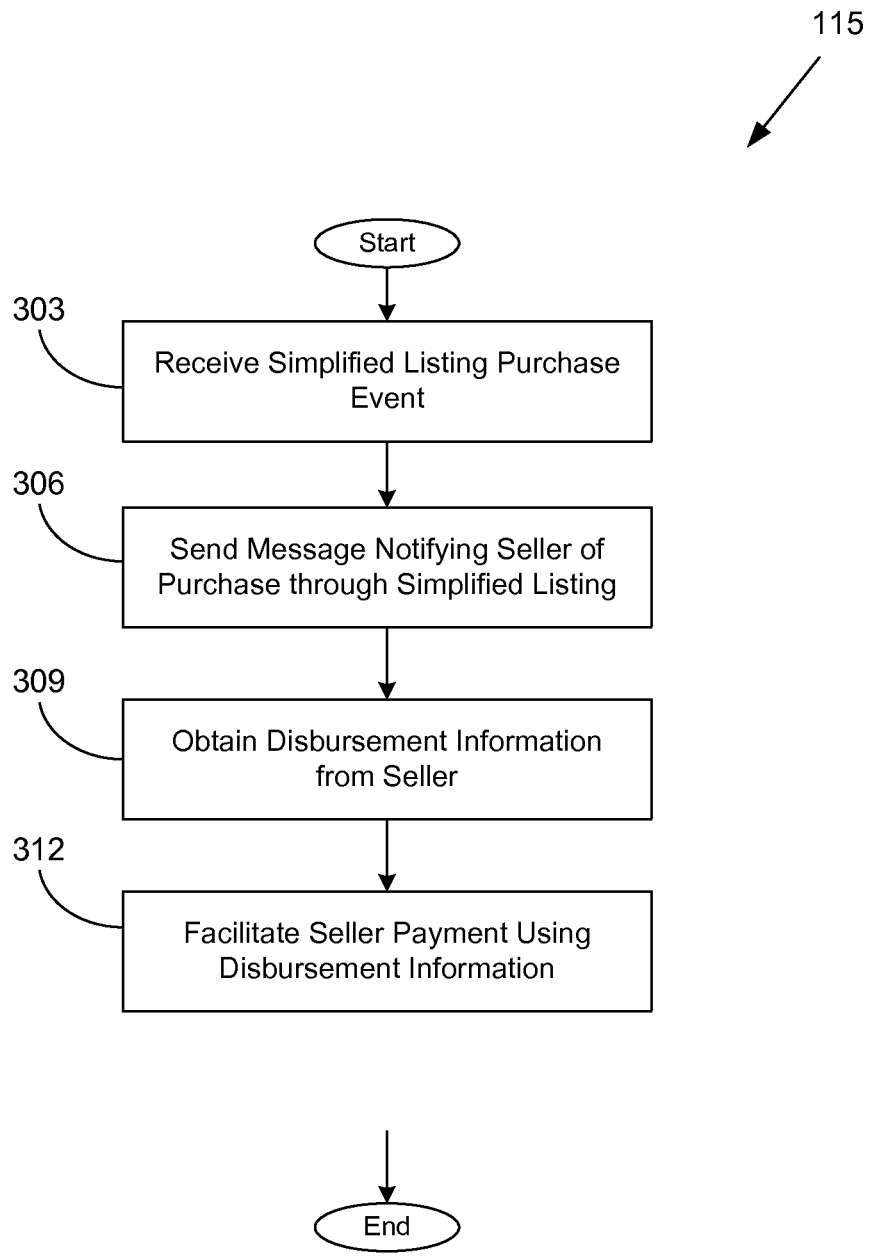
FIG. 3 is a flowchart illustrating an example of functionality implemented as portions of a simplified listing generator application 115 executed in a computing device in the networked environment of FIG. 1 according to various embodiments of the present disclosure.

Turning now to FIG. 3, shown is a flowchart that provides one example of the operation of a portion of the simplified listing generator application 115 (FIG. 1) according to various embodiments. It is understood that the flowchart of FIG. 3 provides merely an example of the many different types of functional arrangements that may be employed to implement the operation of the portion of the simplified listing generator application 115 as described herein. As an alternative, the flowchart of FIG. 3 may be viewed as depicting an example of steps of a method implemented in the computing device 103 (FIG. 1) according to one or more embodiments.

Where creation of a simplified seller listing 136 was discussed in connection with FIG. 3, the operation of the simplified listing generator application 115 when triggered by a purchase through the simplified seller listing 136 will now be discussed. Beginning at box 303, the simplified listing generator application 115 receives an event or notification from the electronic commerce application 118 that an item 130 was purchased through a seller listing 136 generated by the simplified listing process. The event may provide information identifying the particular seller listing 136. Next, at box 306, the simplified listing generator application 115 uses the seller contact data 139 in the data store 124 to generate and send a message to notify the seller that an item 130 was purchased from a simplified seller listing 136. The contact information for the particular seller may be located, for example, by extracting a seller identifier from the seller listing 136 and using the seller identifier to locate the particular seller in the seller contact data 139.

At box 309, the simplified listing generator application 115 obtains disbursement information from the seller identified in the simplified seller listing 136. In some embodiments, the seller interacts with the simplified listing generator application 115 to provide this disbursement information. For example, the seller may log in again with a username created during the simplified listing process or with a simplified seller listing identifier. In other embodiments, the seller provides the simplified listing generator application 115 with the disbursement information using the same mechanism which the simplified listing generator application 115 used to notify the seller of the buyer's purchase. For example, the seller may send a text message or email message including the disbursement information to an address provided during the simplified listing process, using a predefined message format to communicate the disbursement details.

Next, at box 312, the simplified listing generator application 115 uses the disbursement information to pay the seller for the buyer's purchase. The process of FIG. 3 is then complete.

In some embodiments, this second stage of interaction with the simplified listing generator application 115 described in FIG. 3 occurs as part of a seller registration process. That is, the simplified process described herein is used to list items 130, but disbursement to the seller involves some or all of the same registration process as the full-featured listing process.

With reference now to FIGS. 4A-G, shown are drawings of example network pages 400 rendered by a browser application 145 (FIG. 1) executing on a client device 106 (FIG. 1) in the networked environment 100 (FIG. 1) according to various embodiments of the present disclosure. Viewed as a series, the network pages 400A-G illustrate an example scenario in which a seller provides information to the simplified listing generator application 115 as part of the simplified listing process.

Figure 4A:
FIGS. 4A-G are drawings of example network pages rendered by a browser application executing on a client device in the networked environment of FIG. 1 according to various embodiments of the present disclosure.

With reference now to a first network page 400A in FIG. 4A, the screen generated by the simplified listing generator application 115 allows a seller to upload an image of product or other item 130 which the seller may wish to sell through the electronic marketplace. In this example, the seller interacts with a browse control 403 to select and upload a particular file to the simplified listing generator application 115. Once the image is uploaded, the simplified listing generator application 115 identifies the product in the image using any of a variety of techniques as described herein, then searches the electronic catalog 127 for one or more matches to the identified product.

Figure 4B:
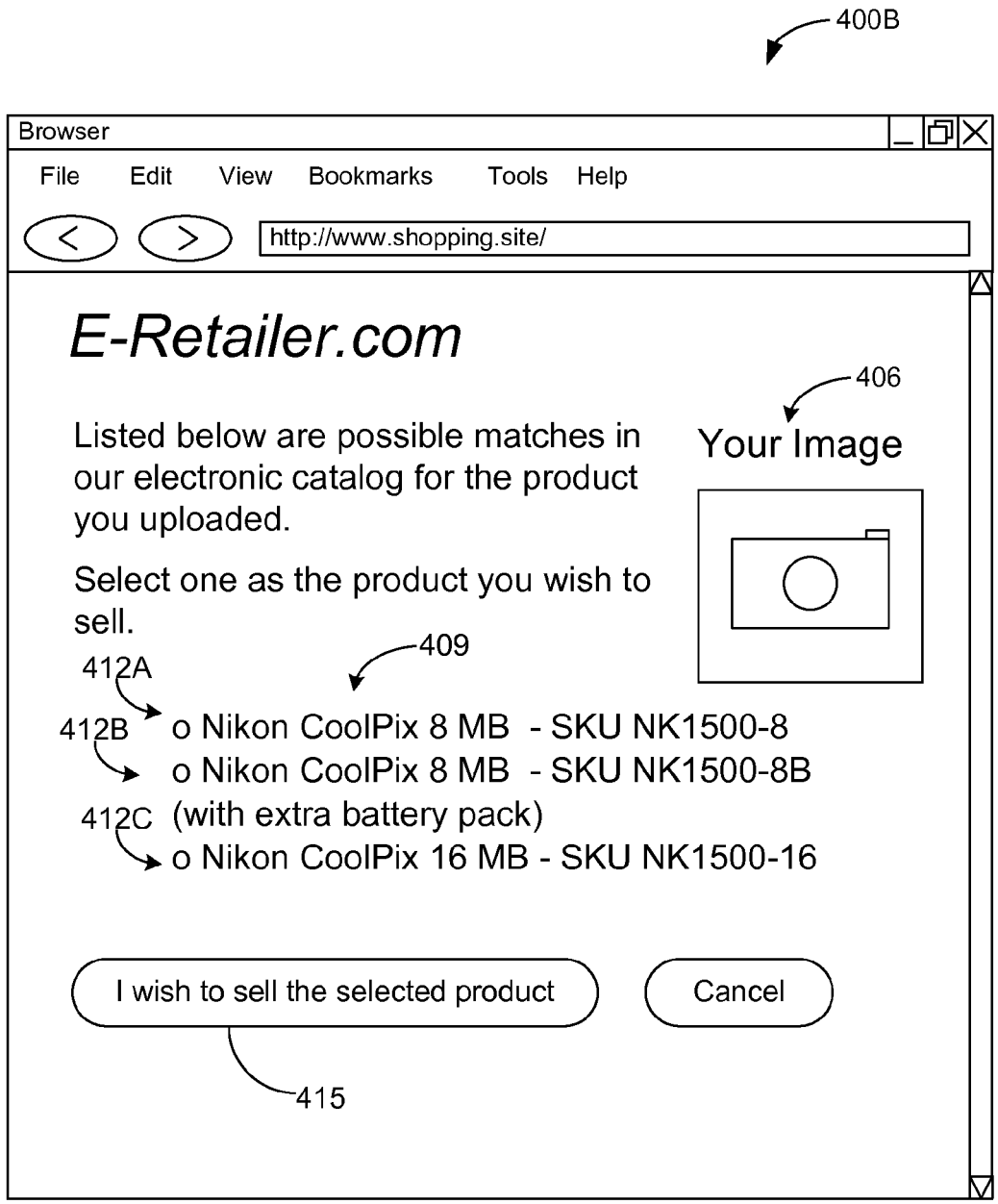

Next, as shown in the network page 400B in FIG. 4B, the simplified listing generator application 115 presents to the seller the uploaded image 406 and a list 409 of products in the electronic catalog 127 which at least partially match the product identified in the uploaded image. In this example scenario, the image is of a camera, and the list contains three matches. The seller selects one of the products 412A, B, C and confirms through button 415 the selected product as the product to be listed for sale in the electronic marketplace.

Figure 4C:
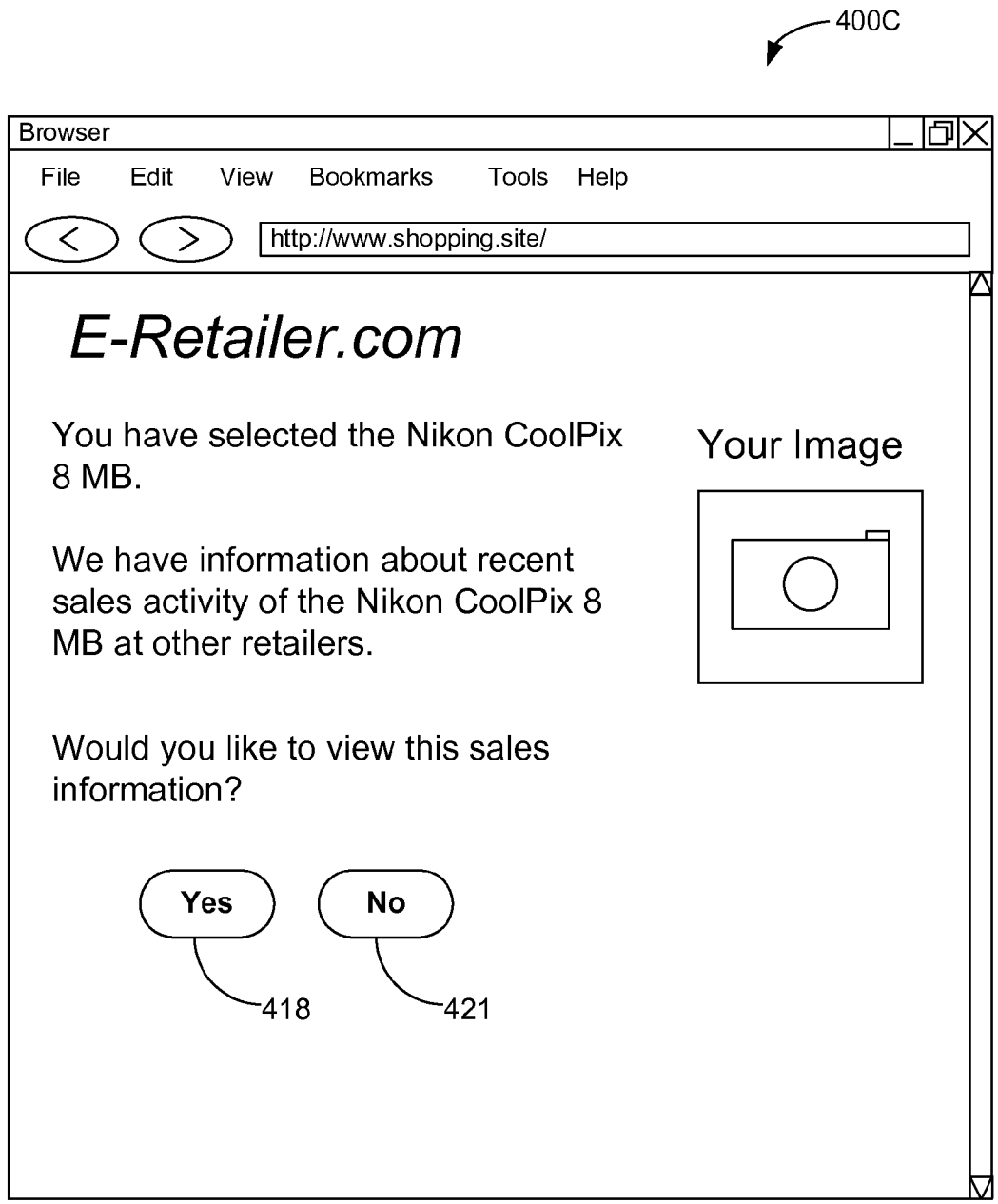

Next, as shown in the network page 400C in FIG. 4C, the simplified listing generator application 115 notifies the seller that information can be viewed about sales activity of the selected product at other retailers. The seller indicates through button 418 an interest in the sales activity, or declines the information through button 421.

Figure 4D:
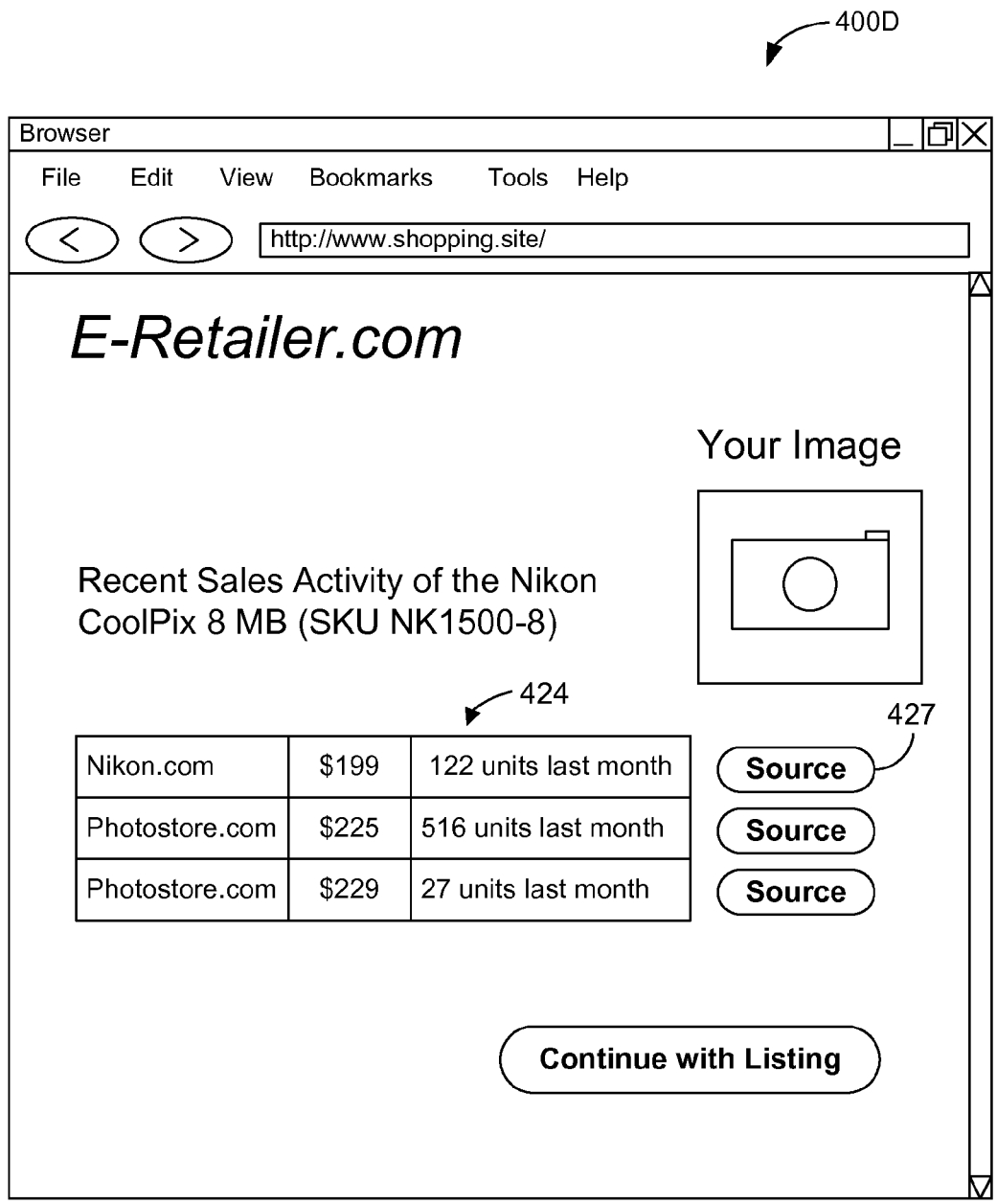

In this example scenario, the seller has indicated an interest in viewing the sales activity, so the simplified listing generator application 115 next generates a network page 400D as shown in FIG. 4D. The sales activity information is presented in a table 424. In this example, information about sales activity at three other retailers is presented.

Figure 4E:
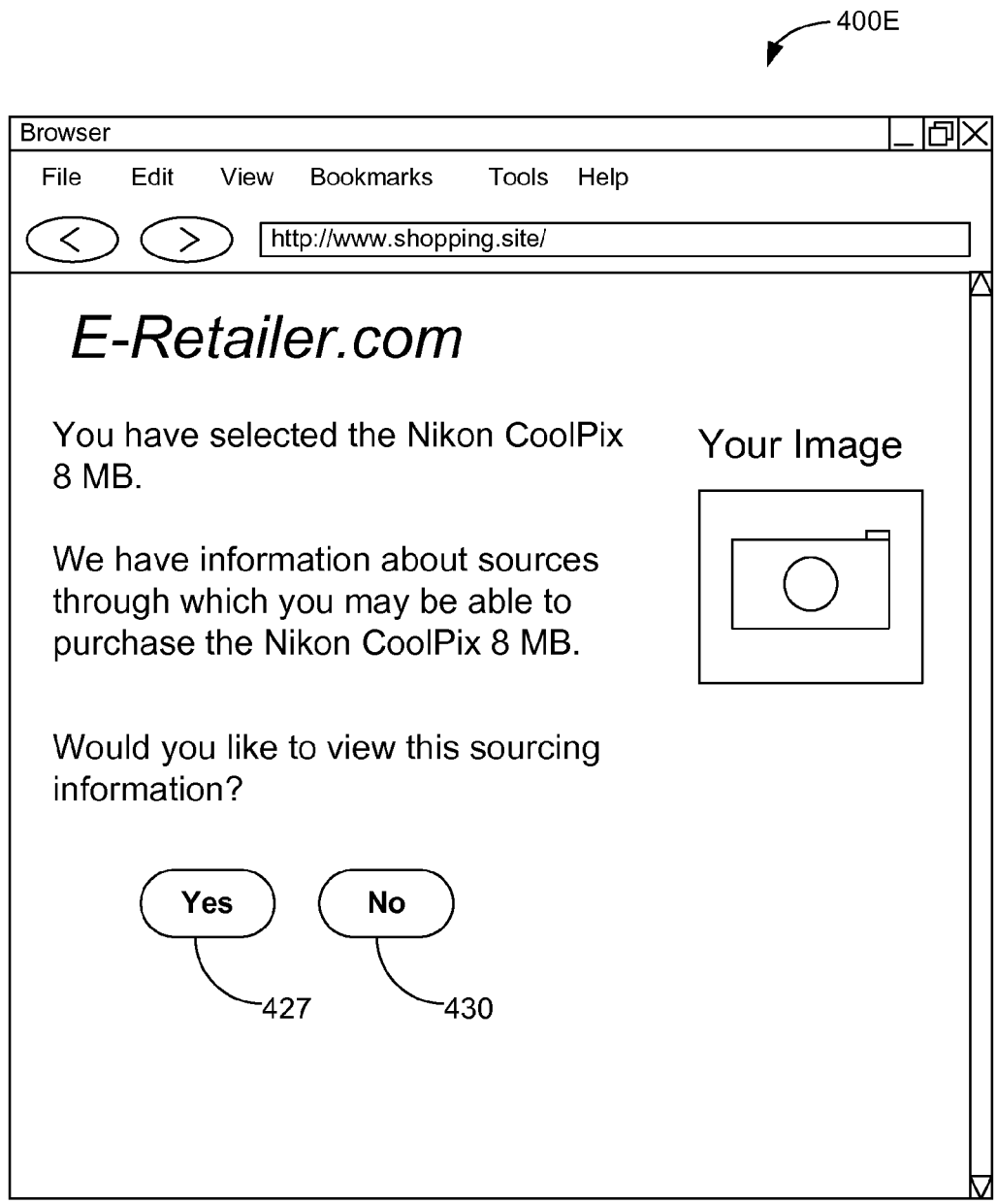

Next, as shown in the network page 400E in FIG. 4E, the simplified listing generator application 115 notifies the seller that information can be viewed about sources through which the selected product may be available to the seller. The seller indicates through button 427 an interest in the sourcing information, or declines the information through button 430.

Figure 4F:
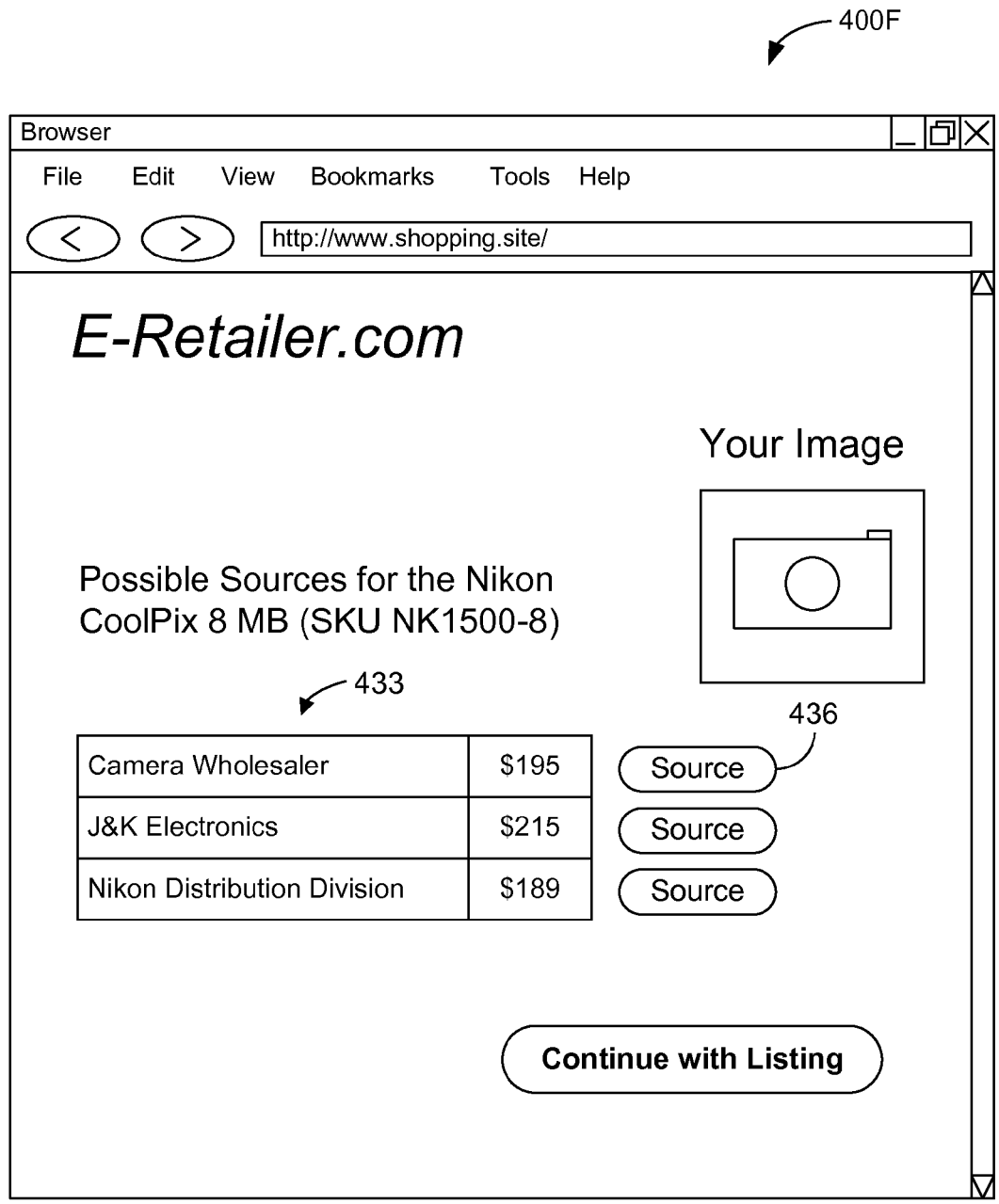

In this example scenario, the seller has indicated an interest in viewing the sourcing information, so the simplified listing generator application 115 next generates a network page 400F as shown in FIG. 4F. The sales activity information is presented in a table 433. In this example, information about three possible sources for the product is presented. Shown in conjunction with each source is a source button 436, which leads to another network page with more details about how the seller can obtain the product from the corresponding source. In some embodiments where the simplified listing generator application 115 further allows the seller to order or obtain items 130 from a particular source, the seller may specify the location to which the source delivers the items 130. For example, the seller may choose to have the source ship the items 130 to the electronic merchant so that the electronic merchant can act as the fulfillment center for purchase of the item 130. As another alternative, a seller may choose to have the items 130 delivered to himself so that the seller can fulfill the items 130.

Figure 4G:
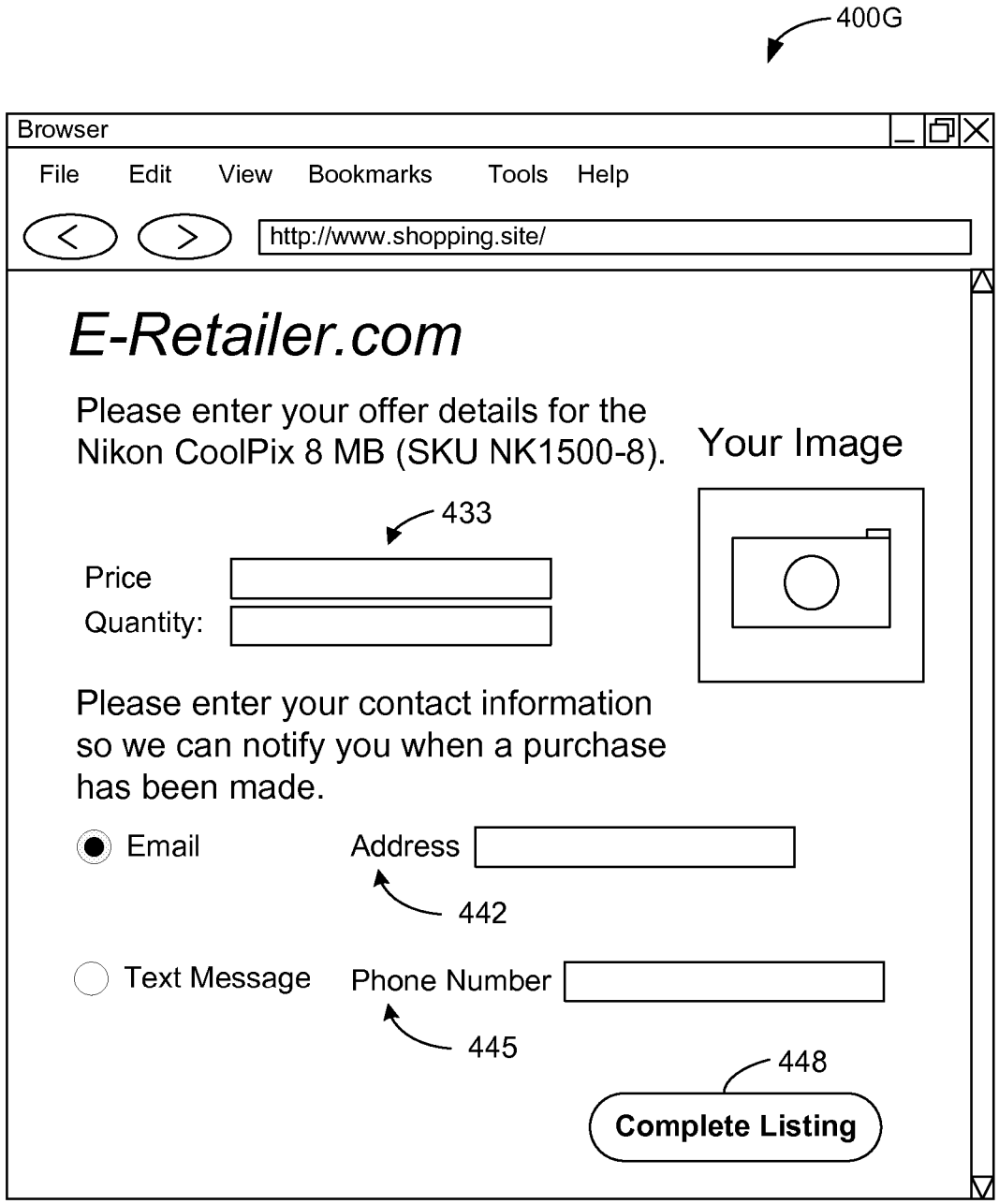

Next, as shown in the network page 400G in FIG. 4G, the simplified listing generator application 115 obtains from the seller details 439 of the seller's offer, such as price and quantity. Also obtained from the seller is contact information such as an email address 442 or a phone number 445. When the information has been completed, the seller indicates through button 448 that the simplified listing generator application 115 should generate a simplified seller listing 136 and publish the simplified seller listing 136 to the electronic catalog 127, using a process such as that described above.

Figure 5:
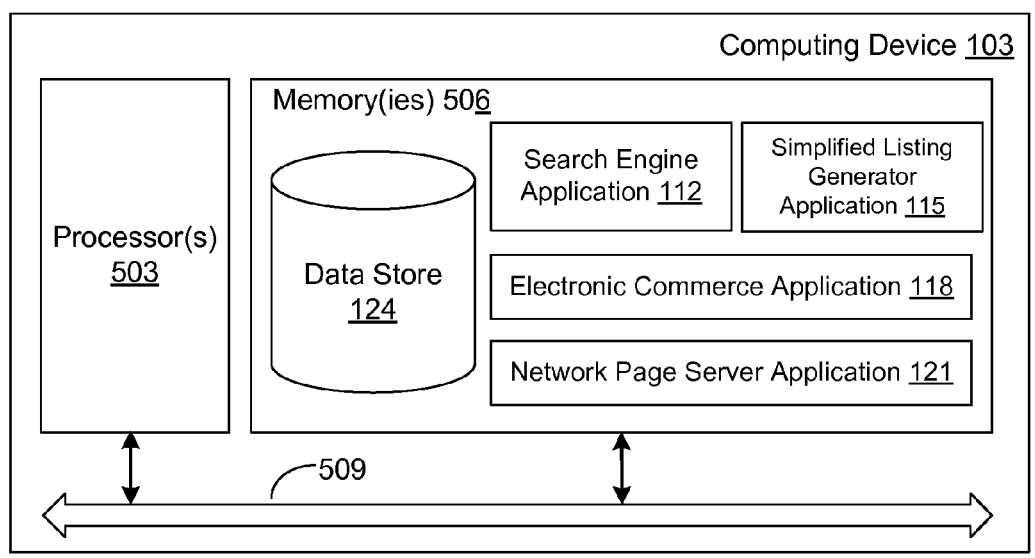
FIG. 5 is a schematic block diagram that provides one example illustration of a computing device employed in the networked environment of FIG. 1 according to various embodiments of the present disclosure.

Moving on to FIG. 5, shown is a schematic block diagram of the computing device 103 (FIG. 1) according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the search engine service 112, the simplified listing generator application 115, the electronic commerce application 118, the network page server application 121, and potentially other applications. Also stored in the memory 506 may be a data store 124 and other data. In addition, an operating system may be stored in the memory 506 and executable by the processor 503. While not illustrated, the client device 106 also includes components like those shown in FIG. 5, whereby a browser application 145 is stored in a memory and executable by a processor.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the search engine service 112, the simplified listing generator application 115, the electronic commerce application 118, the network page server application 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the simplified listing generator application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in the flowcharts of FIGS. 2 and 3 may be executed concurrently or with partial concurrence. Further, in some embodiments, one or more of the blocks shown in the flowcharts of FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the simplified listing generator application 115, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that obtains, from a seller operating from a guest account in an electronic marketplace, an image representing a product, attributes of an offer for sale of the product in the electronic marketplace, and contact information for the seller, wherein operating from the guest account does not require the seller to provide disbursement information until the seller is notified of a purchase;
    code that determines an identifier of the product based at least in part on the image using computerized image recognition;
    code that searches an electronic catalog for at least one matching product that at least partially matches the identifier;
    code that presents, to the seller, information about the at least one matching product;
    code that receives an indication from the seller to proceed with the offer for the at least one matching product;
    code that generates, upon receiving the indication and based at least in part on the attributes and the identifier, the offer by the seller to sell the product in the electronic marketplace; and
    code that obtains the disbursement information from the seller and notifies the seller through the contact information when a buyer purchases the offer to complete a sale of the product.

2. A computer-implemented method, the method comprising:
    obtaining from a seller, by at least one computing device, a representation of an item to be offered for sale in an electronic marketplace and contact information for the seller, wherein the representation of the item is obtained without requiring the seller to provide disbursement information until the seller is notified of a purchase;
    matching, by the at least one computing device, the representation of the item to be offered for sale with an item in an electronic catalog using computerized image recognition;
    generating, by the at least one computing device and based at least in part on the matched item, a seller listing for the item to be offered for sale in the electronic marketplace; and
    notifying, by the at least one computing device, the seller through the contact information when a buyer purchases the matched item from the seller through the seller listing.

3. The method of claim 2, further comprising identifying the item to be offered for sale from the representation.

4. The method of claim 3, wherein the representation corresponds to at least one of a bar code associated with the item to be offered for sale, an image of the bar code associated with the item to be offered for sale, and a photographic image of the item to be offered for sale.

5. The method of claim 3, wherein the representation corresponds to a unique identifier of the item to be offered for sale.

6. The method of claim 2, further comprising:
    subsequent to the buyer purchasing the matched item through the generated seller listing, obtaining the disbursement information from the seller; and
    using the disbursement information to pay the seller for the purchase.

7. The method of claim 2, further comprising registering the seller with the electronic marketplace subsequent to the buyer purchasing the item.

8. The method of claim 7, wherein registering the seller further comprises obtaining the disbursement information from the seller, and the method further comprises using the disbursement information to disburse funds to the seller for the purchase.

9. The method of claim 2, wherein matching further comprises searching the electronic catalog for at least one item that matches the representation, and wherein generating the seller listing is conditional upon the search successfully finding the at least one item that matches.

10. The method of claim 2, further comprising:
matching the representation of the item with a plurality of items in the electronic catalog;
presenting, to the seller, information about the plurality of items; and
obtaining from the seller a designation of one of the plurality of items as the item in the electronic catalog.

11. The method of claim 10, wherein generating the seller listing is further conditional upon receiving the designation from the seller and generating is further based at least in part on a designated one of the plurality of items that matches the representation.

12. The method of claim 2, further comprising obtaining from the seller a price of the item and a quantity of the item, wherein the seller listing includes the price and the quantity.

13. A system, comprising:
at least one computing device; and
an application in the at least one computing device, the application comprising:
logic that obtains, from a seller operating from a guest account in an electronic marketplace, an image representing an item and contact information for the seller;
logic that maps the image representing the item to an identifier of the item using computerized image recognition;
logic that generates, based at least in part on the identifier of the item, a seller listing for the item in the electronic marketplace;
logic that notifies the seller through the contact information when a buyer purchases the item through the seller listing; and
logic that defers obtaining disbursement information from the seller until after the seller is notified of a purchase by the buyer.

14. The system of claim 13, wherein the image representing the item comprises at least one of a bar code associated with the item, an image of the bar code associated with the item, or a photographic image of the item.

15. The system of claim 13, wherein the application further comprises logic that presents, to the seller, information describing a sales performance of the item.

16. The system of claim 15, wherein the information relates to the sales performance of the item at a retailer other than the electronic marketplace.

17. The system of claim 15, wherein the application further comprises logic that presents, to the seller, a price for the item as listed by at least one other seller in the electronic marketplace.

18. The system of claim 13, wherein the application further comprises logic that presents, to the seller, information describing at least one source through which the seller can purchase the item.

19. The system of claim 18, wherein the application further comprises logic that obtains, from the seller, an instruction to obtain the item from the at least one source.

20. The system of claim 19, wherein the application further comprises logic that obtains, from the seller, an indication of a fulfillment method used to fulfill the purchase of the item.

* * * * *